US009153063B2

(12) United States Patent
Bartholomew et al.

(10) Patent No.: US 9,153,063 B2
(45) Date of Patent: Oct. 6, 2015

(54) SYSTEM AND METHOD FOR DATA RENDERING AND TRANSFORMATION IMAGES IN 2- AND 3- DIMENSIONAL IMAGES

(71) Applicant: Analytical Graphics Inc., Exton, PA (US)

(72) Inventors: Michael Bartholomew, Philadelphia, PA (US); Patrick Cozzi, Drexel Hill, PA (US); Francesco Linsalata, Berwyn, PA (US); James Tucholski, Malvern, PA (US)

(73) Assignee: ANALYTICAL GRAPHICS INC., Exton, PA (US)

(*) Notice: Subject to any disclaimer, the term of this patent is extended or adjusted under 35 U.S.C. 154(b) by 165 days.

(21) Appl. No.: 13/779,844

(22) Filed: Feb. 28, 2013

(65) Prior Publication Data

US 2013/0222370 A1     Aug. 29, 2013

Related U.S. Application Data

(60) Provisional application No. 61/604,585, filed on Feb. 29, 2012.

(51) Int. Cl.
*G06T 15/00* (2011.01)
*G09B 29/12* (2006.01)

(52) U.S. Cl.
CPC .............. *G06T 15/005* (2013.01); *G09B 29/12* (2013.01)

(58) Field of Classification Search
CPC .............................. G09B 29/12; G06T 15/005
USPC .......................... 345/419, 420; 382/154, 293
See application file for complete search history.

(56) References Cited

U.S. PATENT DOCUMENTS

| 5,963,664 | A  | * | 10/1999 | Kumar et al. | 382/154 |
| 6,928,314 | B1 | * | 8/2005  | Johnson et al. | 600/407 |
| 8,270,769 | B2 | * | 9/2012  | Judelson | 382/293 |
| 8,614,707 | B2 | * | 12/2013 | Warsito et al. | 345/420 |

* cited by examiner

*Primary Examiner* — Phu K Nguyen
(74) *Attorney, Agent, or Firm* — The Marbury Law Group, PLLC

(57) ABSTRACT

A device and method for displaying data simultaneously in two-dimensional and three-dimensional formats. A user selects data to be represented in multiple formats simultaneously. A data rendition server retrieves the data and determines the three-dimensional representations that are possible. The user then selects the three-dimensional representation desired, and the server renders the data to the user in both two-dimensional and three-dimensional formats. The data may be rendered together with static data such as digital terrain data and other static data types. Data representations may be rotated and morphed as desired by the user.

35 Claims, 14 Drawing Sheets

SYSTEM AND METHOD FOR DATA RENDERING AND TRANSFORMATION IMAGES IN 2- AND 3- DIMENSIONAL IMAGES

CROSS REFERENCE TO RELATED APPLICATIONS

This application claims priority under 35 U.S.C. §119(e) from provisional application No. 61/604,585 filed Feb. 29, 2012. The 61/604,585 provisional application is incorporated by reference herein, in its entirety, for all purposes.

BACKGROUND

The various embodiments described herein provide a system and method for dynamically rendering a 3D representation of data in a dimension different than an initial 2D base layer representing related space and aerospace datasets, although the techniques described herein will find broader occasions in a variety of data representation situations.

In an embodiment, the user selects desired parameters from a datastore to be displayed in the 2D base layer. The user also selects one or more parameters to be represented in a third dimension from a datastore. The system has an inventory of display techniques through which certain data may be displayed.

The system also comprises rules for the display of specific data. For example, and without limitation, certain data may be appropriately displayed in one format but is not susceptible to being displayed in a second format. The processor and server have rules associated with the data type to allow the processor to present the user options for display of a specific data based upon the techniques by which that data may be displayed. Thus the user is presented only with choices for display that are relevant to the data type.

Based on the type of data selected by the user, the processor determines which of a plurality of predetermined display formats would be appropriate and presents the options to the user. The user selects the desired display format from the list of choices and the processor generates the image.

The various display formats are selected from the set comprising 2D surface morphing, 2D plane rotation, 2D to 3D continuous morphing, 3D to 2D continuous morphing, and 2D/3D combined data representation. This list is by way of illustration only and is not meant as a limitation.

DETAILED DESCRIPTION

Figure 1:
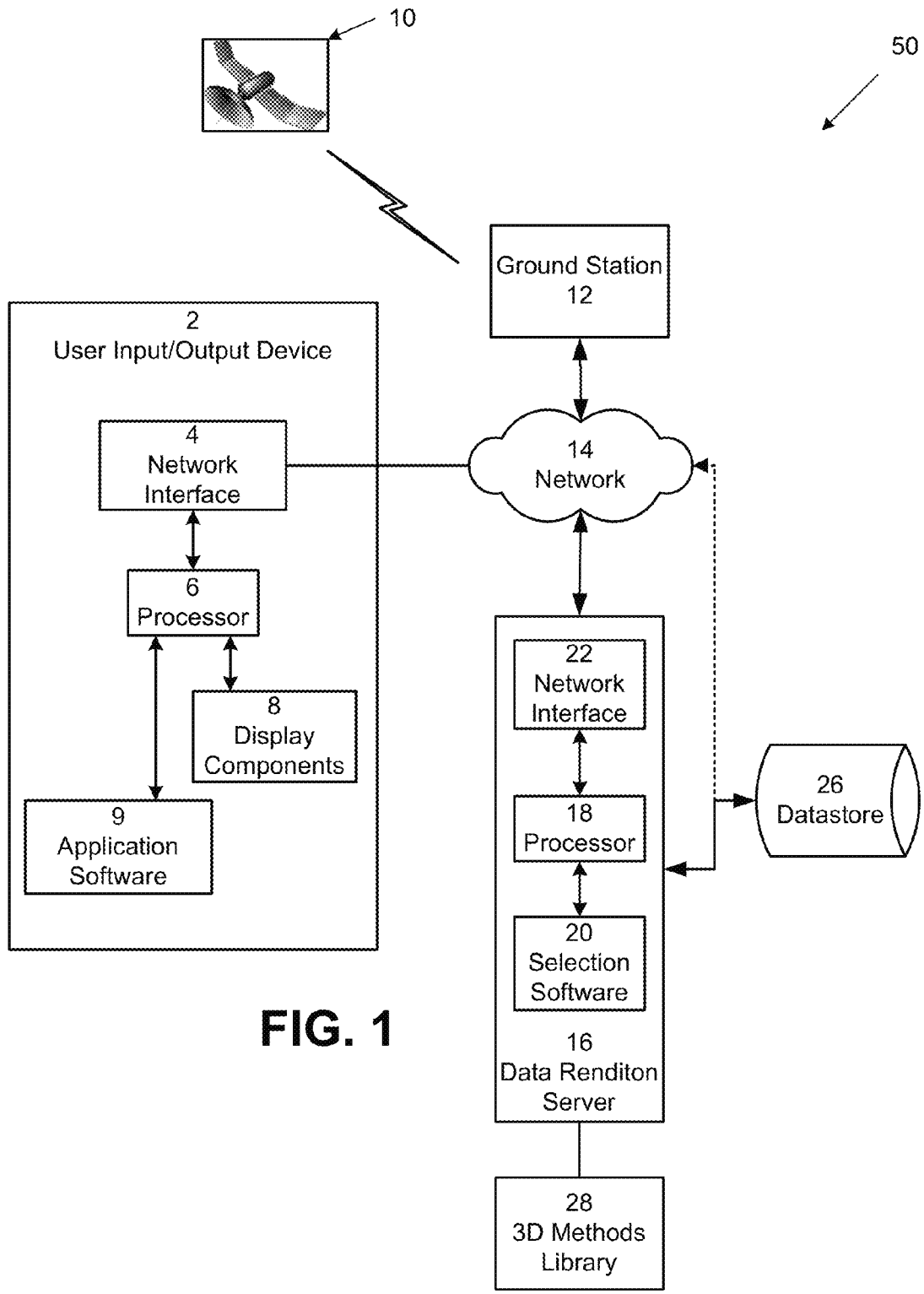
FIG. 1 is a block diagram illustrating components of a data rendering and transformation system according to an embodiment.

FIG. 1 is a block diagram illustrating components of a data rendering and transformation system according to an embodiment. In an embodiment, data rendering and transformation system 50 includes user input/out device 2 and a data rendition server (DRS) 16. The DRS 16 comprises a processor 18 that is configured with selection software 20. The selection software 20 may include software executable instructions that configure the processor 18 to perform various operations that include receiving data from a datastore 26. In an embodiment, the data stored in datastore 26 may include data acquired from real-time sources, historical data and data generated by processing performed by the DRS 16. As illustrated the datastore 26 may be accessible to DRS 16 via a network 14 or through a wired or wireless path. While datastore 26 is illustrated as a single entity, datastore 26 may include any number of storage devices accessible to the DRS 16. The storage devices may be co-located or physically separated and accessible via a network (not illustrated).

The DRS 16 may also include a network interface 22 for communicating via a network, such as network 14.

A user may interact with the DRS 16 using the input/output device 2. The input output device 2 may include a network interface 4, a processor 6, display components 8 and application software 9. In an embodiment, the user interacts with the DRS 16 through the user input/output device 2 over a network, such as network 14. The network 14 may be the Internet, an intranet, a wireless network, or other networks known in the art.

In an embodiment, the user uses input/output device 2 to select data for rendering from the datastore 26. Alternatively or in addition to the data acquired from datastore 26, the user may request a real-time data feed of satellite/sensor data from a real-time data source, such as satellite 10. In this case, a ground station 12 would receive data from the satellite 10 via a communications link and relay the received data over a network, such as network 14, to the DRS 16. In an embodiment, the relayed data may be received by the input/out device 2 via the network interface 4 displayed to the user via display components 8. Further, the relayed data may be saved to the datastore 26.

The user may also identify selected data for rendering in three dimensions (3D). A 3D methods library 28 that is accessible to the DRS 16 may be used by the DRS to identify one or more display options for data that is requested by the user for rendering in 3-D. By way of illustration and not by way of limitation, data may be displayed using a two-dimensional surface morphing format, a two-dimensional plane rotation format, a two-dimensional to three-dimensional morphing format, and a two-dimensional/three-dimensional combined data representation format. In an embodiment, the 3D methods library 28 may be stored on a storage device that is part of the DRS 16.

The user may also identify additional data for inclusion in the rendition of the requested data. For example the user may request that static information, such as, for example, digital terrain data for the geographic area requested, be included for display with the requested data.

Figure 2:
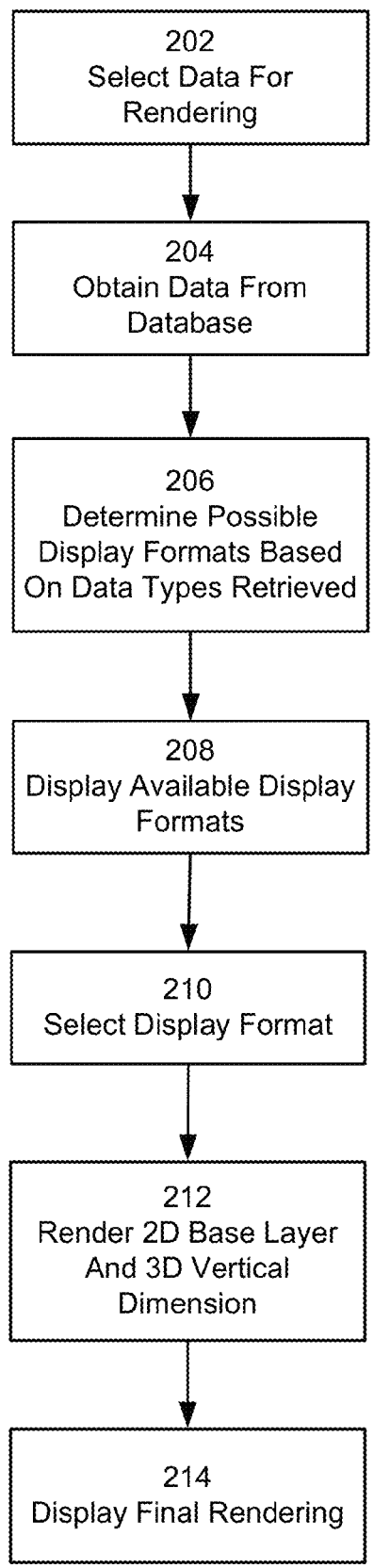
FIG. 2 is a flow diagram illustrating a process by which data may be displayed in multiple dimensions according to an embodiment.

FIG. 2 is a flow diagram illustrating a process by which data may be displayed in multiple dimensions according to an embodiment.

A user requests data for rendering (Block 202). The request may identify data elements to be rendered in a 3-D format and data elements to be rendered in a 2-D format.

As illustrated in FIG. 1, the user may request data for rendering from the datastore 26. Alternatively or in addition to the data acquired from datastore 26, the user may request a real-time data feed of satellite/sensor data from a real-time data source, such as satellite 10. For example, the user may request that data for a particular geographic region be retrieved from a datastore 26. Further, the user can specify that a particular portion of that region be rendered in three dimensions and another portion of that region rendered in two dimensions. Optionally, the user may request additional data for inclusion in the rendition of the requested data. For example the user may request that static information, such as, for example, digital terrain data for the geographic area requested, be included for display with the requested data and these additional data would be retrieved from datastore 26.

The requested data may be acquired by sensors and/or satellites of different kinds. Additionally, additional data may be retrieved from databases accessible to the DRS 16. For example static data such as a digital terrain database may also be accessed. Because data may be stored using different formats, the DRS 16 comprises instructions for identifying potential display formats that are possible for a particular data type and presenting the display formats for selection by a user of the DRS 16.

The DRS 16 obtains the requested data from a database or from a real-time source (Block 204). The DRS determines one or more possible formats in which the requested data may be displayed (Block 206). In an embodiment, the determination of possible formats is based on the type of data being displayed. For example, the selection software 20 of the DRS 16 may establish rules for selecting the 3-D illustration method that is most appropriate for the data that is requested by the user for display in 3-D.

The available display formats are presented to the user on the input/output device 2 (Block 208). The user may then respond with the desired display format. (Block 210). The DRS 16 determines from the request which data elements to render in 2D and which elements to render in 3D, processes the data according to the selected format, and renders the 2D and 3D elements (Block 212).

The data is displayed on the input/output device 2 using the display components 8 (Block 214).

In this way, 2D and 3D images of data may be superimposed for rendering on a user device.

As noted above, the various data used in the representations does not need to be derived from a datastore, but may be a real-time representation of incoming data. Likewise, the generated image does not need to be static. Both the 2D base layer and the 3D vertical dimension may be based on changing data. In an embodiment, the processor may receive live data from a real-time source, such as satellite 10 and update, via the DRS 16, the rendered image to reflect the most current data. The graphical representation of the data may be displayed in real-time as the data changes. For example, while the relative ground track of a satellite may be reasonably static, the position of a particular satellite in that orbit is not. The near real-time position of a satellite may be displayed on the particular track of interest, whether that interest is a ground track or a three-dimensional representation of the orbit.

In another embodiment, a particular point or region of the 3D representation may be associated with additional data elements that may be accessed by a pointing device. For example, the additional data elements may include the geographic location of features and boundaries on Earth, such as natural or constructed features, oceans, and more. The additional data elements may be stored as coordinates and topology, and may include data that may be separately rendered or jointly rendered with the combined 2D and 3D representation.

Figure 3:
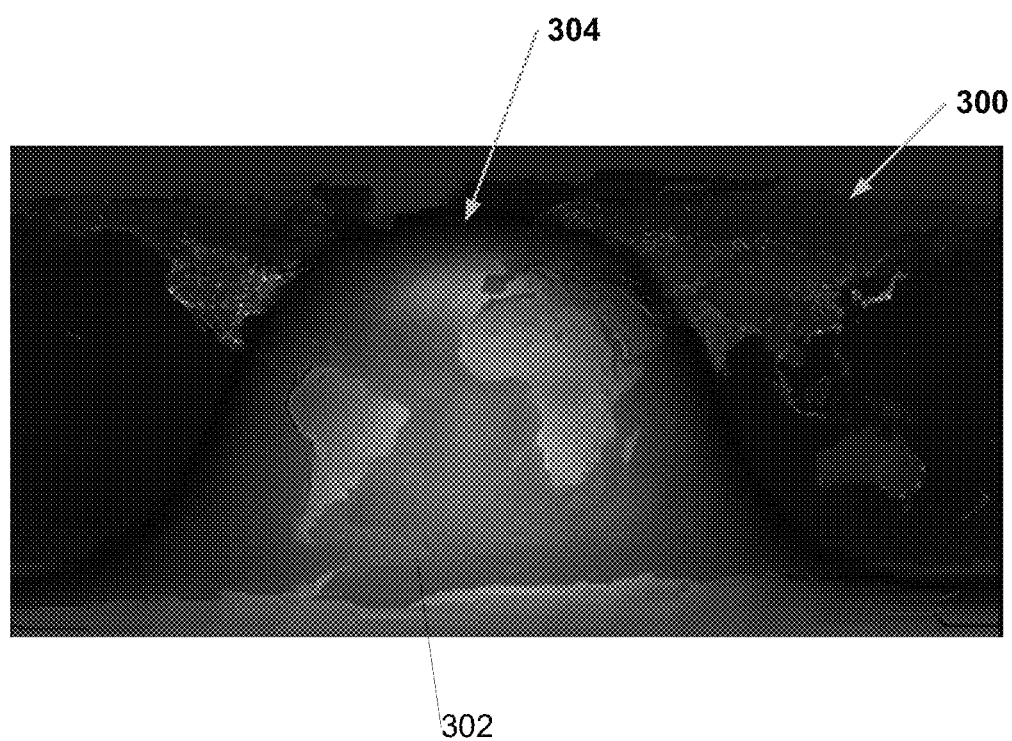
FIG. 3 illustrates a graphical representation of two-dimensional and three-dimensional data according to an embodiment.

FIG. 3 illustrates a rendering of data indicative of the amount of sunlight reaching different parts of the Earth at a selected time on a selected day. The data is rendered in both two dimensions and three dimensions. In this example, a 2D map of the Earth is used as a base layer 300. The data parameters for the 2D base layer are the latitude and longitude of the various features of the Earth. Additionally, the various oceans and landmasses of the Earth are also depicted. The processor 18 accesses the selected data in the datastore 26, compiles it and renders a 2D representation of the data, in this case, a map of the Earth.

In this example, the user selects sunlight intensity as the parameter to be represented in the vertical dimension. Data for this parameter is loaded from the datastore 26 by the data rendering processor 18. The processor 18 analyzes the selected data types and presents the user with a list of display formats which would display the data correctly and understandably. The user selects the desired display format from a list provided by the DRS 16 based on the types of data to be analyzed. For example, the user may select a 2D surface morphing display format. In this display format, the processor morphs areas of the 2D surface to represent values in the vertical dimension for the area of the Earth that is in sunlight 302. This area is rendered in a third dimension and may be rendered in a position relative to the 2D surface morphing display to indicate the portion of the Earth that is illuminated.

The rendering of the illuminated portion of the Earth may also be rendered in a manner that is indicative of the intensity of sunlight reaching the surface of the Earth at a particular location and at a particular point in time. For example, the more sunlight that is reaching the Earth in a particular area the higher the relief of that area would be with respect to other areas on the surface of the Earth. Thus the selected sunlit portion of the Earth 302 is displayed in a brighter intensity than is the background 2-D data 300 which is rendered in a darker intensity indicative of the fact that those areas of the Earth are in darkness. For those areas of the Earth that are in an intermediate state (e.g. somewhere between full darkness and full light) those areas are rendered in a darker shade 304 indicative of that illumination condition, together with a lower level of relief for that area having less sunlight illumination. In this manner the final rendering appears to the user to be in three dimensions for those areas of the Earth that are illuminated and in two dimensions for those areas of the Earth that are not illuminated.

The processor 18 combines the data representing the 2D map of the Earth with 3D representations of light intensity data for those parts of the Earth which would be exposed to sunlight at the selected date and time. Areas of the 2D map where the light intensity is greatest, such as the equator, would be morphed in a manner that would render the particular location to appear highest, while areas of lower light intensity, such as areas closer to the poles, would be morphed less, thereby appearing lower, but still higher than the flat 2D base layer. Areas of darkness would appear to be at the same height as the underlying 2D base layer representation of the map of the Earth.

Figure 4:
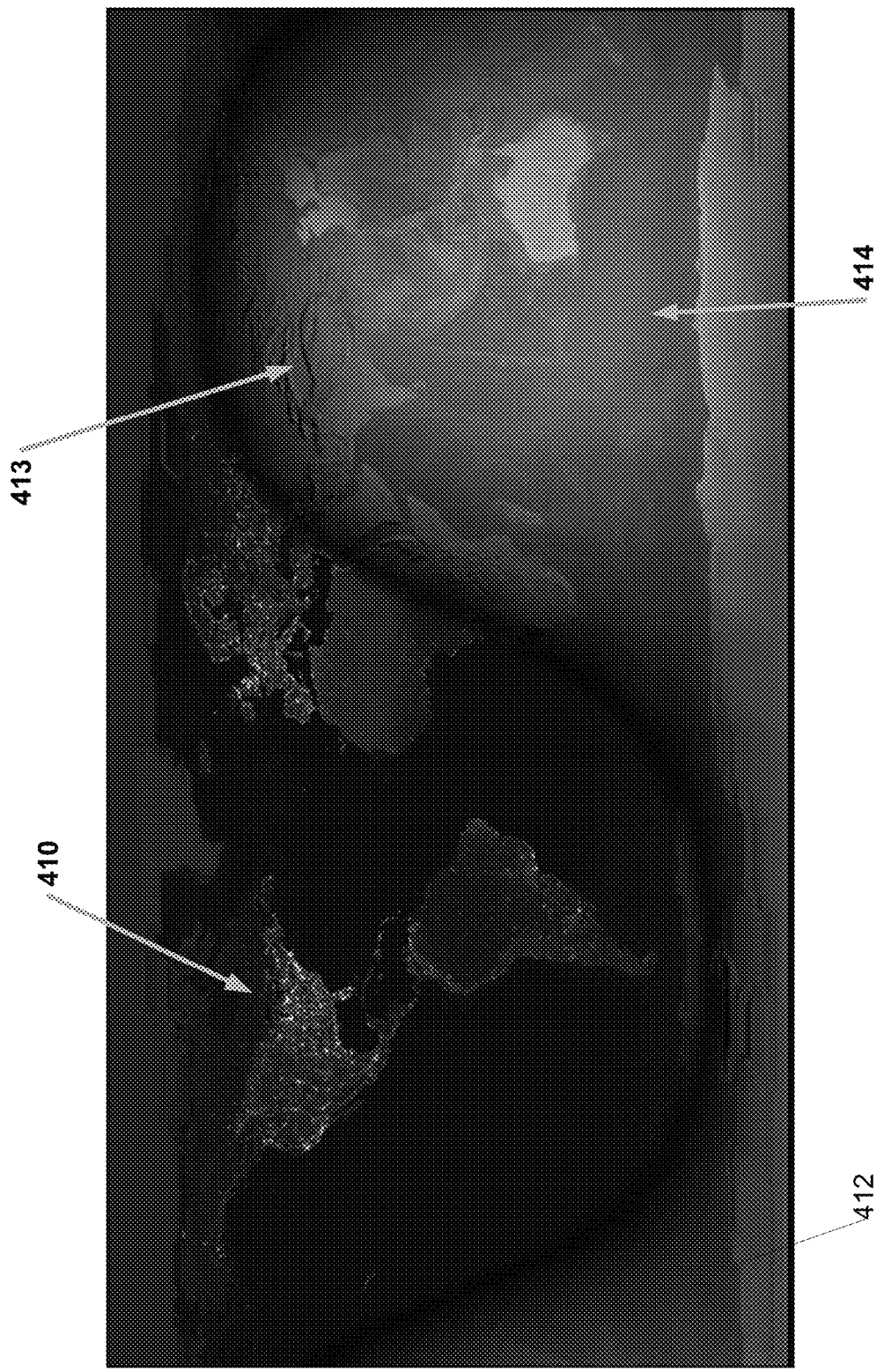
FIG. 4 illustrates an alternative graphical representation of two-dimensional and three-dimensional data according to an embodiment.

FIG. 4 illustrates an alternative rendering of data indicative of the amount of sunlight reaching different parts of the Earth at a selected time on a selected day. As illustrated in FIG. 4, an illuminated portion of the Earth 414 is shown in a 3-D relief (e.g., the mountains 413) and areas in darkness are illustrated as a flat 2-D display 410. The illuminated portion of the Earth 414 is also shown in a brighter intensity than areas of the Earth that are in darkness 410. Further, an area of the Earth that is just beginning to be illuminated 412 is represented by a level of brightness that is greater than the areas of the Earth in total darkness but less than the areas that are fully illuminated. As may be seen from the examples illustrated in FIGS. 3 and 4, data may be superimposed on the 2-D data such as illuminated areas of the Earth from man-made sources 410.

Figure 5:
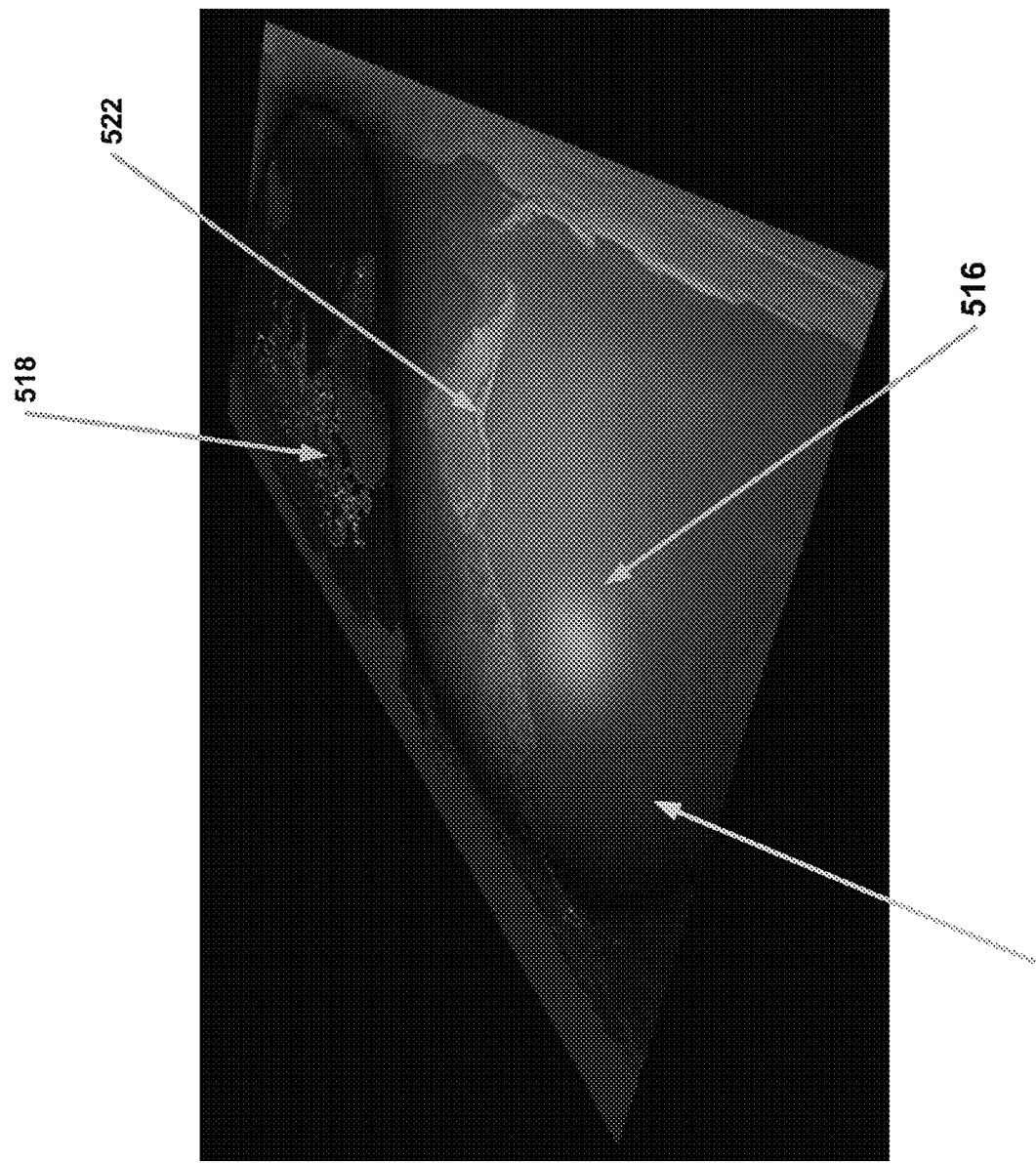
FIG. 5 illustrates an alternative graphical representation of two- and three-dimensional data rotated according to an embodiment.

FIG. 5 illustrates yet another alternative rendering of data indicative of the amount of sunlight reaching different parts of the Earth at a selected time on a selected day. In this rendering, areas of the Earth that are in darkness are illustrated in a two-dimensional flat plane 518. Other data may be superimposed on this flat plane such as areas of the Earth that are illuminated by man-made sources 518. Still other areas of the Earth 516 are shown in a three-dimensional fashion with brighter areas having a higher elevation dimension than those areas that are less brightly illuminated by the Sun 520.

In an embodiment, the illumination model may be rotated about another axis to reveal other information. For example, digital terrain data may be superimposed on top of the three-dimensional view to reveal relief associated with mountains 522. This additional terrain relief would be more visible when the three-dimensional image is rotated so that the user can see that mountainous relief. Additionally, the user may select 2D plane rotation to alter the perspective of the entire rendered image by rotating and tilting the 2D plane in any direction to best display the data.

In an embodiment, the user may select 2D to 3D morphing as the display format, thereby causing the processor 18 to morph the rendered image, having already been optionally rotated and tilted to the desired orientation using the 2D plane rotation process, into a 3D representation of the selected data while maintaining the desired orientation of the viewer. For example, the 2D map of the Earth may be morphed into a 3D depiction of the globe, while still maintaining the perspective selected by the user and while still allowing the user to focus on the particular area of interest, in this case the illuminated area of the surface of the Earth.

In another embodiment, the user may select the 2D/3D combined data representation display format to cause the processor 18 to represent selected data in a 3D vertical dimension in combination with 2D representations of related data. For example, a 2D map of the Earth may be combined with a 3D representation of a satellite in orbit. The altitude of the satellite and position above any given point on the Earth is thus graphically displayed in relation with that point on the Earth. The composite representation may be rotated and tilted to any desired angle to present the most meaningful representation. Illustrations of this representation are presented below.

The various display formats may optionally be combined and/or applied in any desired sequence to produce various views of the data as desired by the user.

The use of a 2D map of the Earth in the foregoing examples is not meant as a limitation. Any data capable of being represented in two dimensions may be used as the 2D base representation. In the case of a map of the Earth, the data are latitude and longitude of the various features on the Earth, but other data, such as stock prices over time could be presented. Additionally, for example, the underwater topography of a region may be presented; soil maps and other geologic and geographic features may also serve as a base layer.

The vertical dimension is not limited to representations of altitude above the 2D plane. By way of example and not limitation, other representations related to a 2D map of the Earth could include magnetic field strength, temperature, air pressure, ozone concentration, population, electricity production rates, ocean salinity, internet connectivity, or any other data related to the underlying 2D map of the Earth.

Alternatively, as noted above, the user may determine which data to render in 2D and which to render in 3D. In response to user selection, the DRS 16 renders the 2D base layer and then renders the appropriate 3D vertical dimension representation in conjunction with the 2D base layer. Finally, the DRS 16 sends the complete rendering to the user input/output device 2 for display using display components 8. Also as noted, the DRS 16 may retrieve data from the datastore 26 to be displayed along with the selected data of interest.

Figure 6:
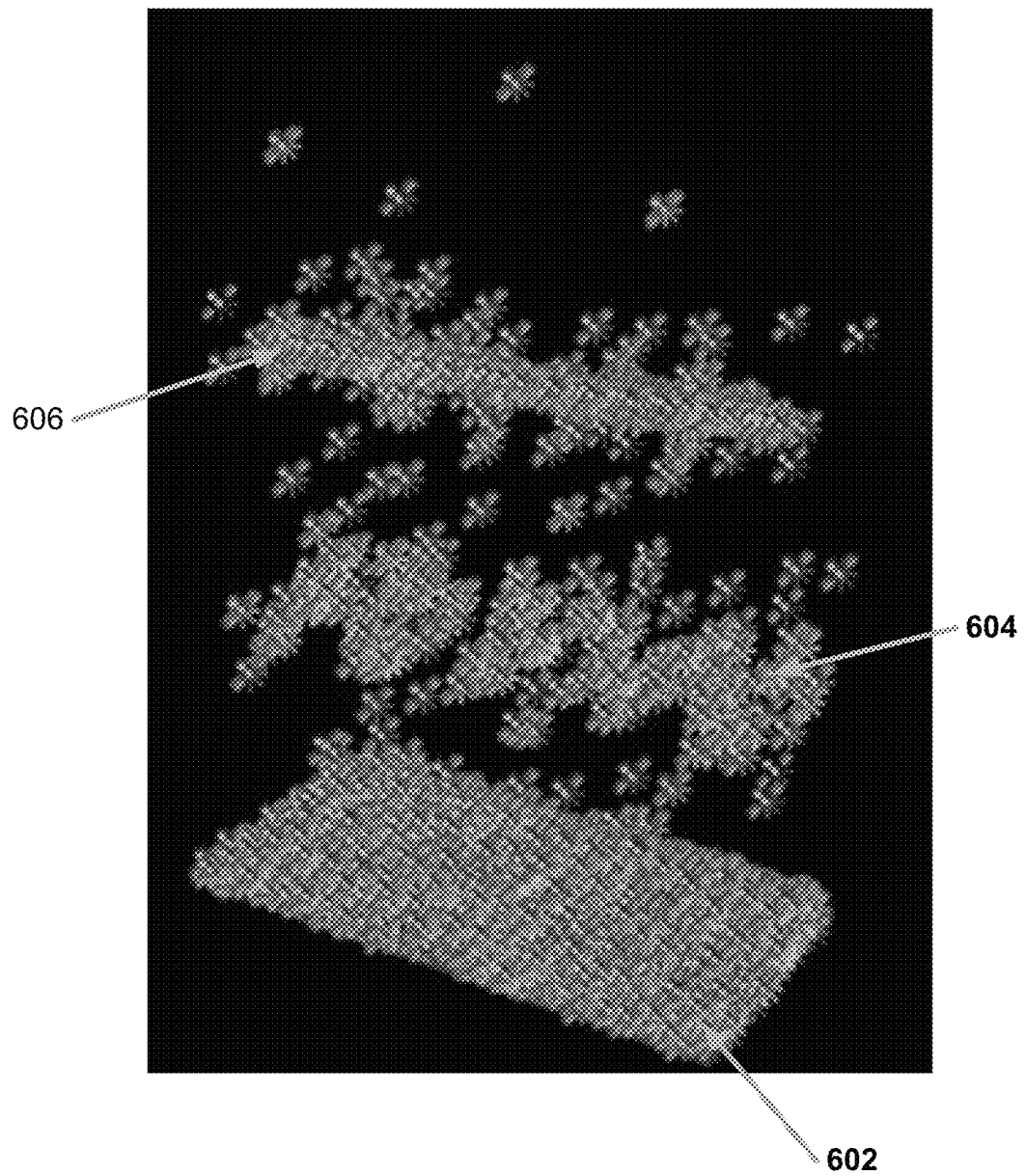
FIG. 6 illustrates an alternate data flow according to an embodiment.

Referring now to FIG. 6 an alternative representation of satellite position is illustrated. In this case, satellites are represented in various orbit distances above the surface of the Earth. However, in this case, rather than representing the satellites in an orbit around the Earth, they are represented at different orbital heights above the surface of the Earth.

Thus satellite grouping 602 may represent satellites in a low Earth orbit or they may simply be the totality of satellites that orbit the Earth regardless of altitude. Satellite grouping 604 may represent selected satellites from the total grouping of all satellites or they may represent the relative position above the Earth of that group based on orbital apogee, perigee or other attributes. Satellite grouping 606 represents yet another grouping of satellites based upon orbital parameters or other indicators of interest.

Figure 7:
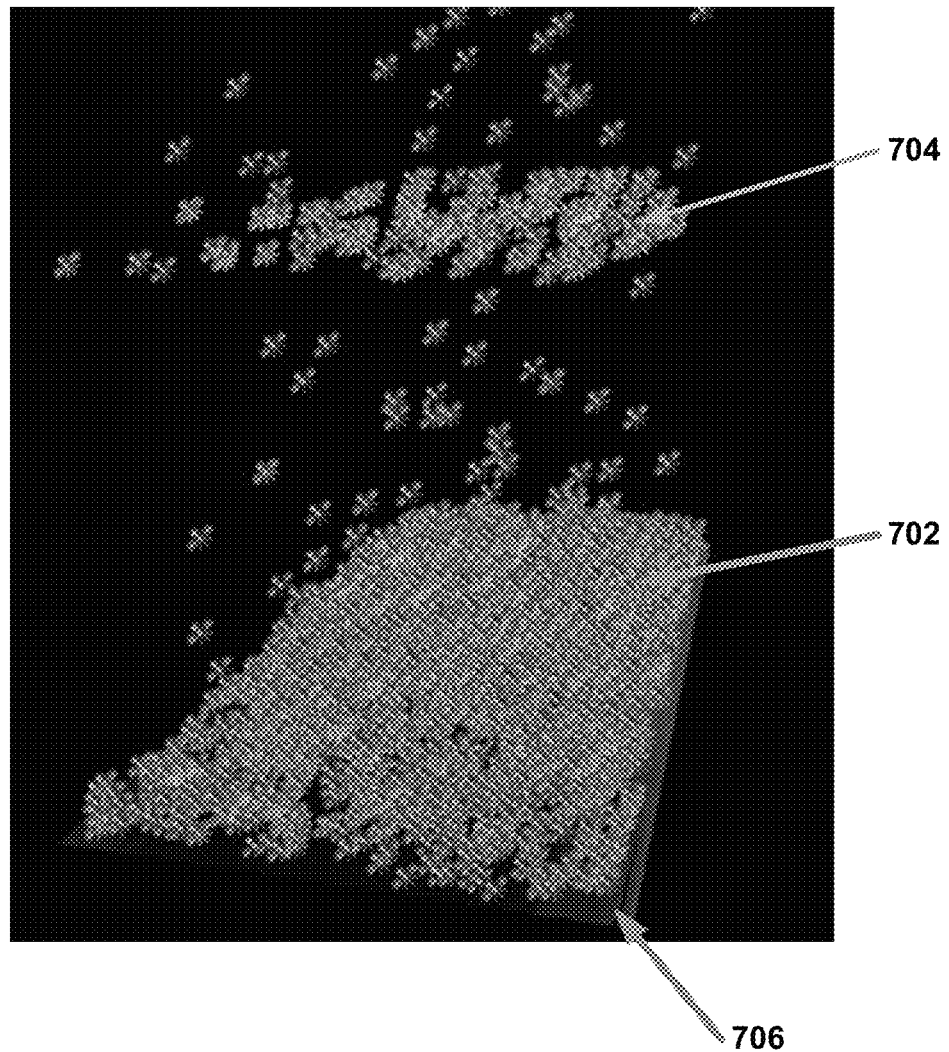
FIG. 7 illustrates two-dimensional and three-dimensional data of satellite positions according to an embodiment.

Referring now to FIG. 7, an alternate representation of the satellite data of FIG. 6 is illustrated with the datum rotated. In this case satellite grouping 702 may again represent satellites in particular orbital altitude while satellites 704 would represent satellites at different orbital altitudes. However, by providing a three-dimensional view of the satellite data, satellites in intermediate altitudes may be identified and a better assessment of the density of satellites over the surface of the Earth obtained.

Additional data 706 may also be displayed to provide, for example, an indication of the Earth's surface, to give further context to the 3-D representation. In an embodiment, the additional data may be actively associated with a displayed object. The additional data may be displayed by interacting with the object using a pointing device, such as a mouse, a stylus or a touch screen.

Figure 8:
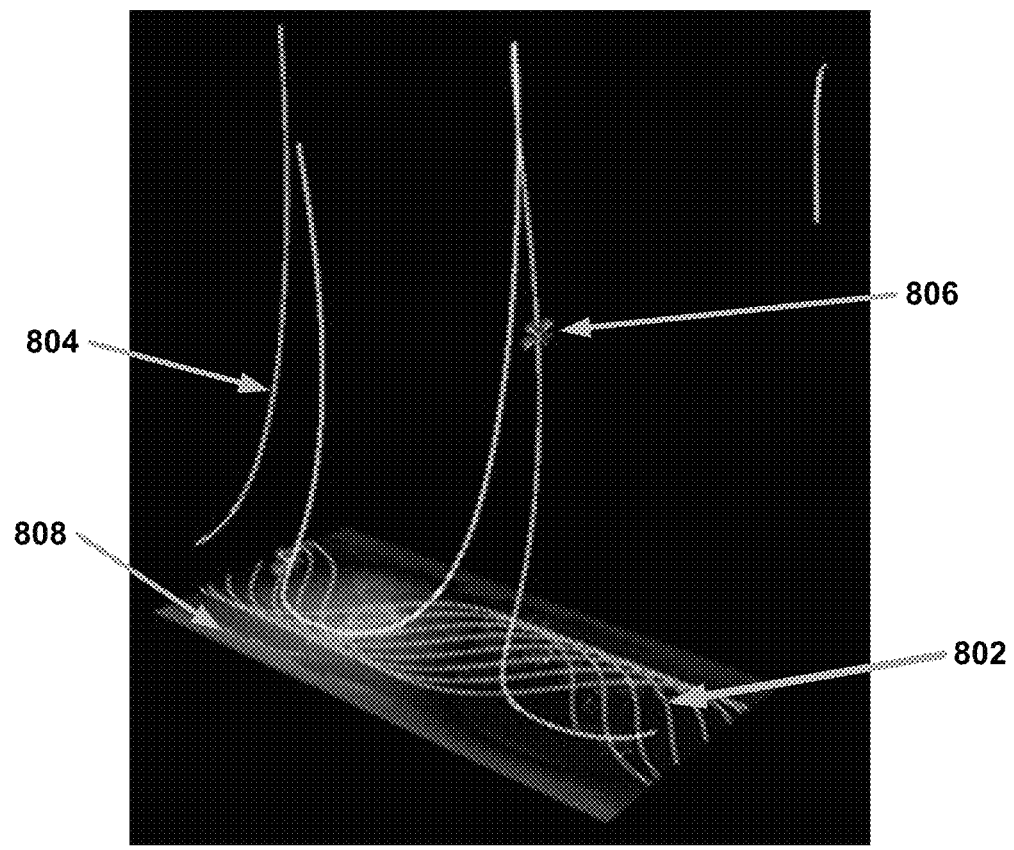
FIG. 8 illustrates two-dimensional and three-dimensional data of satellite ground tracks according to an embodiment.

Referring now to FIG. 8 yet another illustration and representation of two-dimensional and three-dimensional satellite data is illustrated. In this instance normal satellite ground track information 802 is presented over the surface of the Earth 808. In this example, satellite ground track information 802 may be acquired from a datastore 26 of such satellite/sensor information together with additional data relating to the surface of the Earth.

Figure 9:
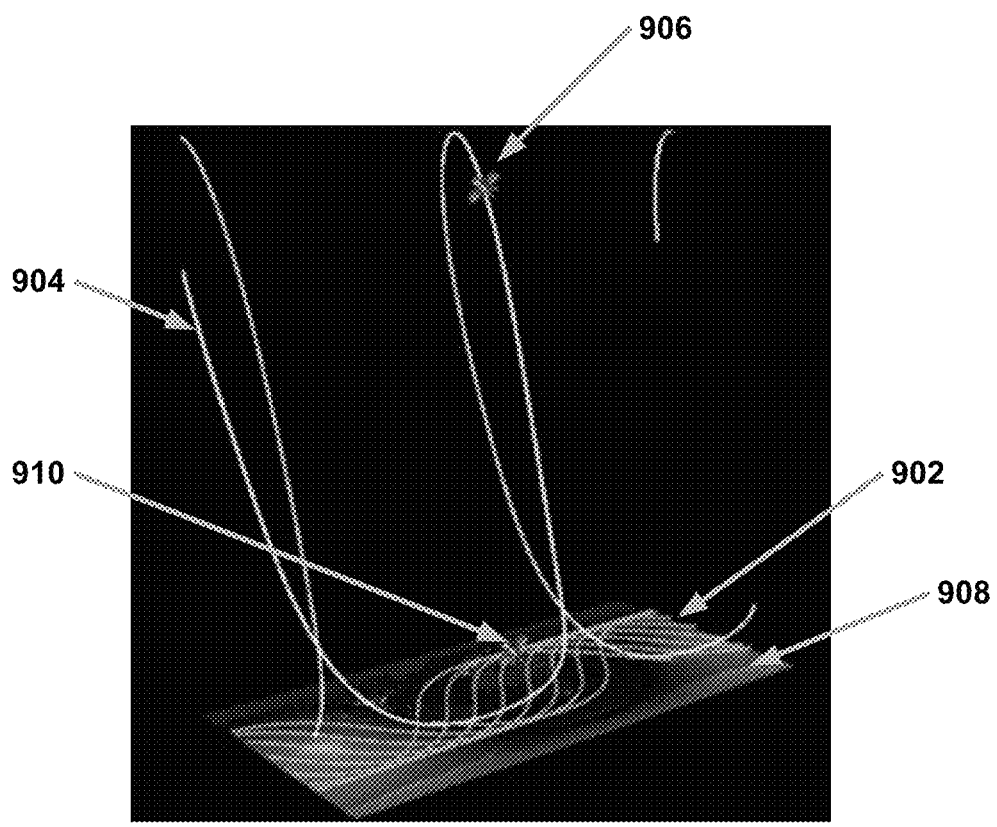
FIG. 9 illustrates a 2-D and 3-D representation of satellite ground tracks where the datum is rotated according to an embodiment.

Referring now to FIG. 9 an alternate representation of the orbital information of FIG. 8 is illustrated. In this example, the datum is rotated so that a different view of the orbits may be obtained. In this example, satellite ground track data 902 and a 2-dimensional datum associated with the Earth 908 are illustrated. The selected orbit 904 is represented in three dimensions above the surface of the Earth 908. Further, the satellite of interest in that orbit 906 is also displayed in its relative position in time with respect to that orbit. In addition, a second satellite 910 in its own orbit is illustrated in a two-dimensional representation allowing both satellites 906 and 910 to be viewed in their positions in the relative orbits relative to one another.

In an alternate embodiment, satellites are depicted in their respective orbits using historical ephemeris data.

Figure 10:
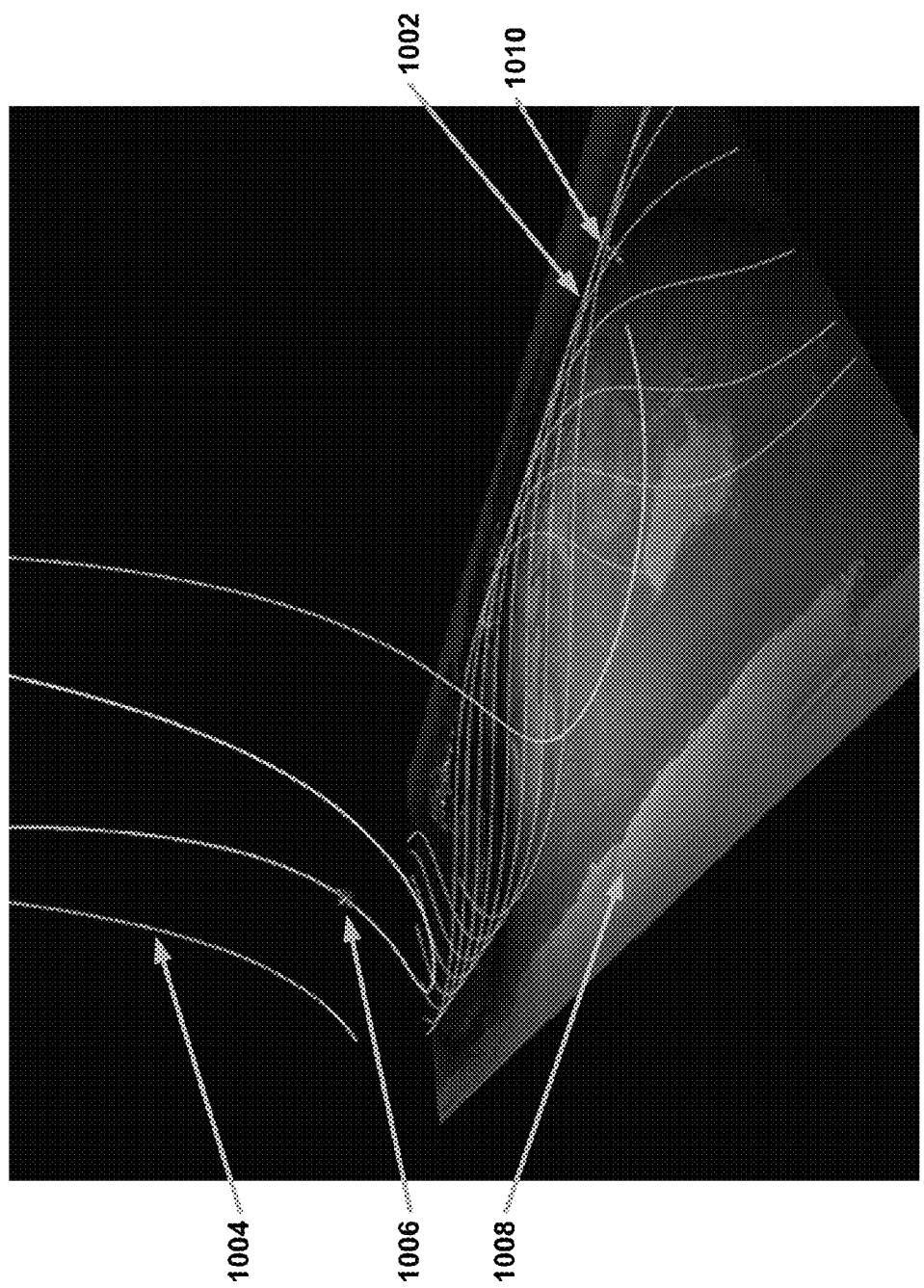
FIG. 10 illustrates a 2-D and 3-D representation of satellite ground tracks including additional ground data from a different perspective according to an embodiment.

Referring now to FIG. 10 the satellite information and datum are further rotated to reveal a different three-dimensional view of satellites in their orbits of interest. In this embodiment, the orbit 1004 has been selected to be viewed in three dimensions above the surface of the Earth. Orbital tracks of other satellites 1002 are also illustrated. Further, the location of a specific satellite 1010 is shown in its orbit in two dimensions together with satellite 1006 in its relative three-dimensional position in its orbit.

Both a satellite 1006 in its orbit that has been chosen to be viewed in three dimensions and a second satellite in its orbit 1010 have been chosen to be viewed in two dimensions. In an embodiment, specific information about a particular satellite may be actively associated with the display satellite object. For example, such information may include, without limitation, ownership of the satellite, characteristics of the satellite, and general orbital parameters. The specific information may be displayed by interacting with the object using a pointing device, such as a mouse, a stylus or a touch screen.

Figure 11:
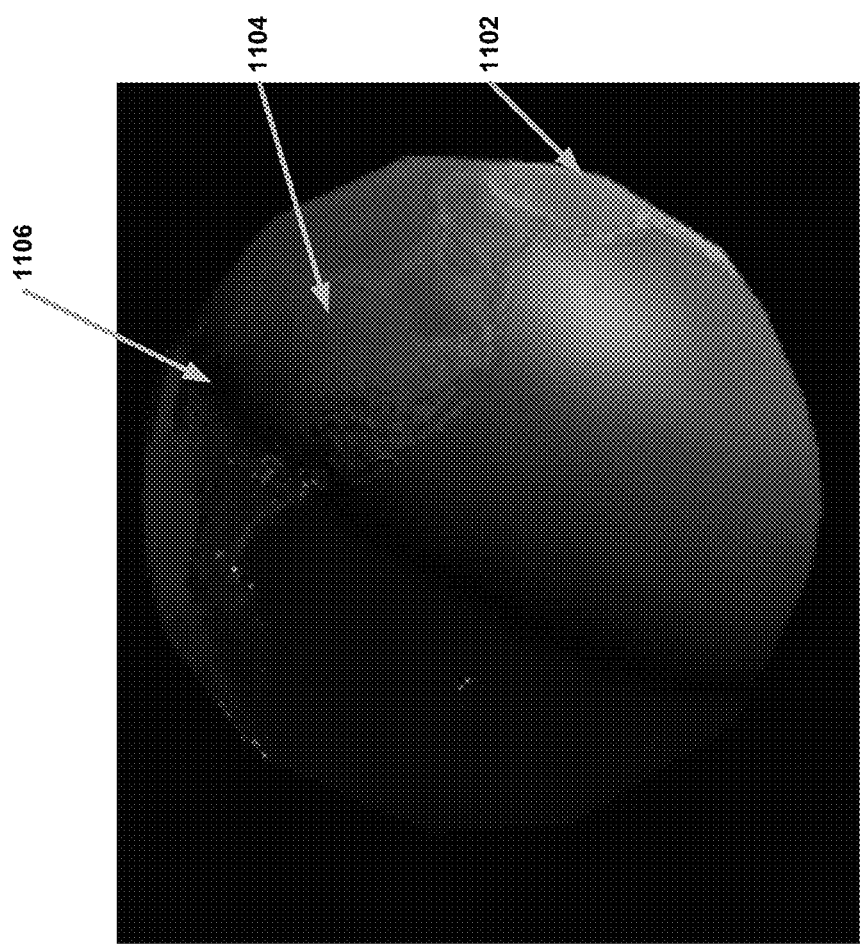
FIGS. 11-14 illustrate continuous morphing of an image from 3-dimensions to 2-dimensions and in reverse according to embodiments.

Referring now to FIGS. 11-14 a systematic morphing from a three-dimensional image to a two-dimensional image is illustrated. In FIG. 11 the Earth is illustrated as a globe. The landmass of South America 1102 is annotated as is the landmass of North America 1104. In addition the sun illumination boundary on the surface of the Earth 1106 is annotated as well by way of reference.

Figure 12:
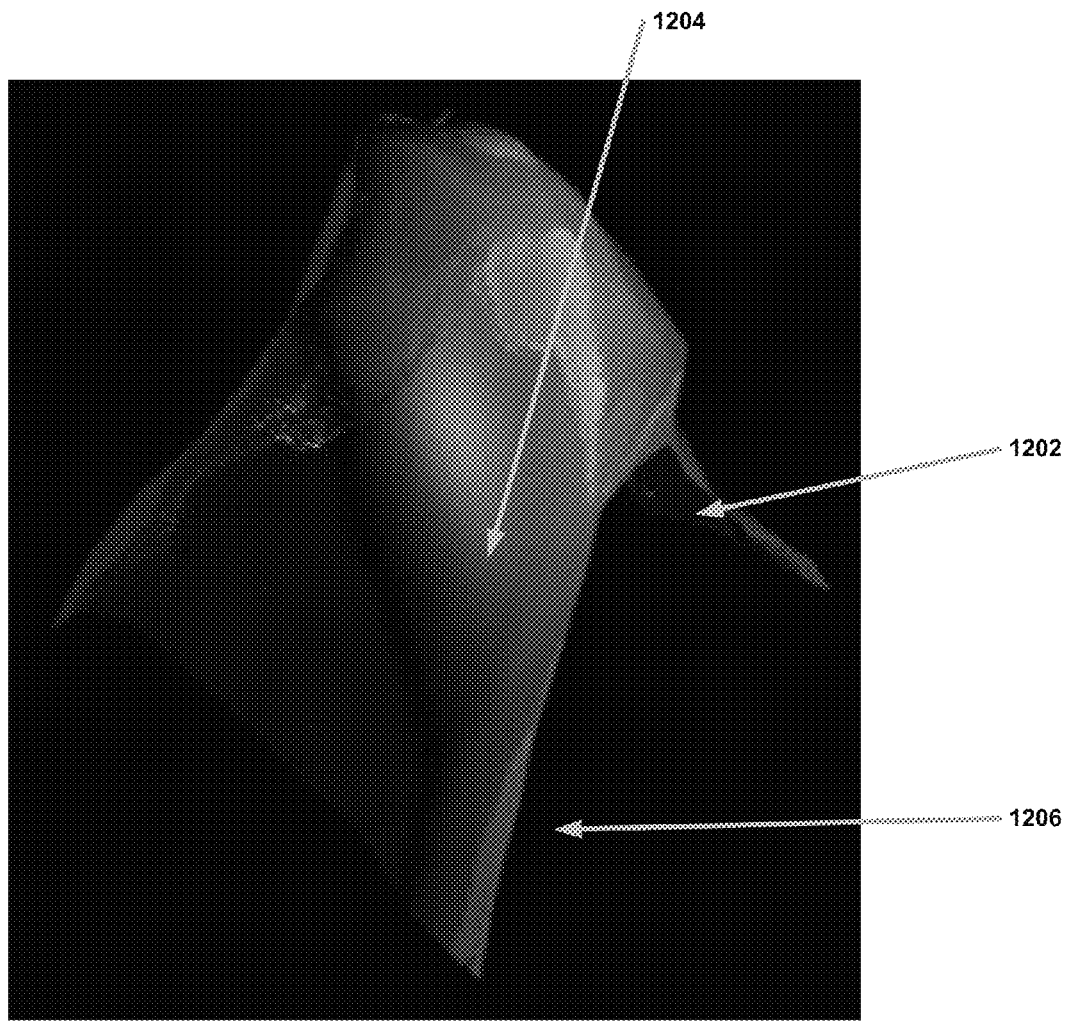

Referring to FIG. 12 the systematic morphing of an illustration of the Earth's surface may be observed. In this case, the user can select this gradual morphing from the three-dimensional image of the globe into a two-dimensional image and observe the progress of that morphing as the rendering server performs its task according to instructions stored on the server. Once again the South American landmass 1202 is annotated as is the North American landmass 1204 together with the sun illumination boundary on the surface of the Earth 1206.

Figure 13:
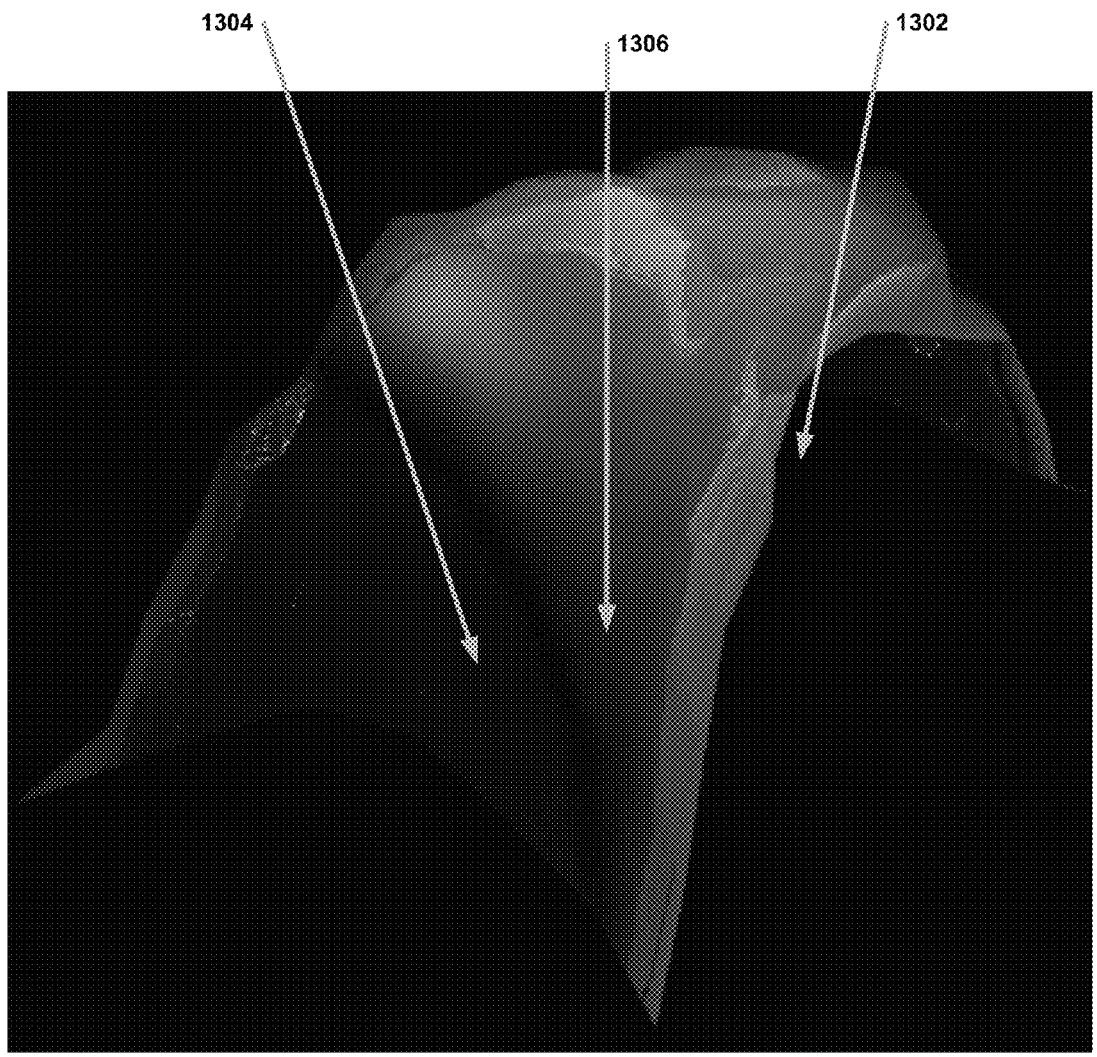

Referring now to FIG. 13 a systematic morphing of the illustration of the Earth's surface continues. One can see the Earth's surface is gradually flattening out yet the various reference points previously illustrated remain. For example, the South American landmass 1302 may be seen in a different representation as the morphing of the surface of the Earth continues. The North American landmass 1304 can similarly be seen although the time it is in darkness depends upon the time of day illustrated. As can also be seen on the North American landmass 1304, additional information concerning man-made illumination of the landmass is also illustrated. Once again the sun illumination boundary 1306 is annotated although in a different physical location than in the previous illustrations.

Figure 14:
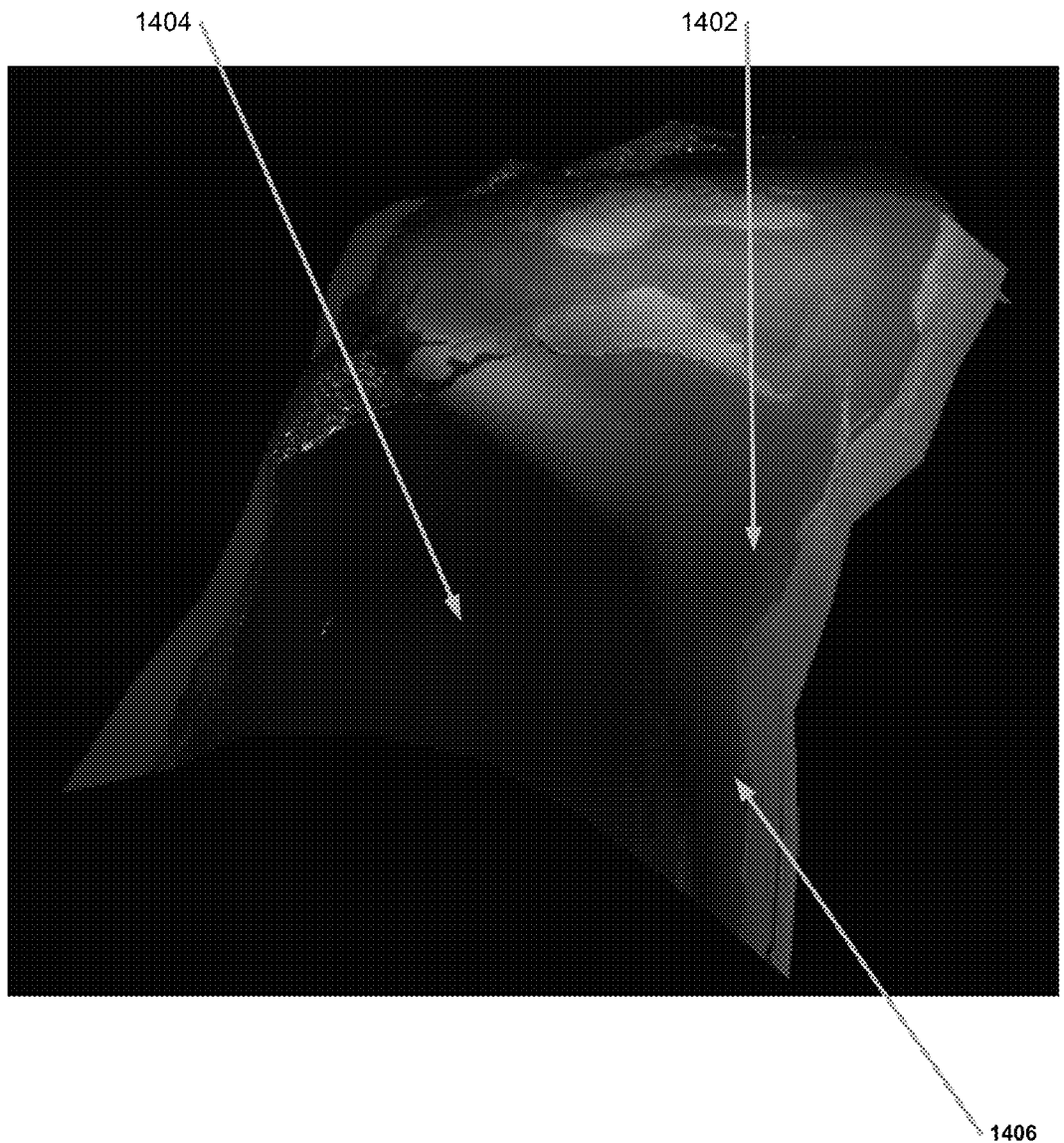

Referring now to FIG. 14 the morphing of the illustrated surface of the Earth continues. In this illustration a two-dimensional area of the surface of the Earth is clearly being illustrated by the rendering server. As the process continues, the entire surface of the Earth will be illustrated in a two-dimensional fashion. Again the South American landmass 1402, the North American landmass 1404, and the sun illumination boundary 1406 are all illustrated.

While an example of morphing from a three-dimensional image to a two-dimensional image is illustrated, the DRS 16 is not limited to morphing in this direction. The DRS 16 may also operate to morph a two-dimensional image to a three-dimensional image.

In addition to the directional morphing discussed above, the morphing process may be paused at any intermediate stage to allow the image to be observed. In an embodiment, a user may use the user input/output device 2 to interact with the intermediate stage image. For example, the intermediate stage image may be rotated in order to reveal different aspects of the morphed image. Once observation of the intermediate stage image is complete, the user may continue the morphing process from the point that the morphing process was paused.

From these representations one can see the flexibility of the system and its various embodiments to show what might normally be seen in two dimensions in a 3-dimensional information format together with other information of relevance.

In other embodiments, the user may optionally color-code the data points in the vertical dimension and the 2D base layer to illustrate additional parameters, and optionally choose whether to represent the vertical dimension in a linear or non-linear proportion. For example, if a user desires to see two different satellite orbits in three dimensions, those orbital tracks may be color-coded to avoid confusion as to which satellite is in which orbit.

In an embodiment, the 3D vertical dimension may include a scale to make measurement of the vertical dimension easier. The scale may be a traditional line with incremental tick marks, or could be in the form of one or more translucent planes, parallel to the underlying 2D base layer which provides a unit of measure in the vertical dimension.

As noted above in various embodiments, the processor evaluates the type of data selected and preselects appropriate display types from a list of predefined rules based on the data type to be represented. The user then selects the desired type of display from the list.

The operation of the system may be accomplished at a dedicated computing device. Alternatively, a web device could be configured to allow the user to select desired data and display formats and have the resulting rendered image display on a web browser.

The foregoing descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

An operating environment for the described embodiments may include a processing system with at least one high speed central processing unit ("CPU") or other processing unit and a memory system. The operating environment may be included in a device, computer or server that is used in conjunction with the various embodiments.

It will be appreciated that the acts and symbolically represented operations or instructions include the manipulation of electrical signals by the CPU. An electrical system with data bits causes a resulting transformation or reduction of the electrical signal representation and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system.

Further, in view of many embodiments to which the principles of the invention may be applied, it should be understood that the illustrated embodiments are exemplary embodiments and should not limit the present invention as defined by the claims. For example, functionality that has been described in reference to a single device may be applied simultaneously or sequentially to any number of devices. Unless specified to the contrary, the steps of the flow charts may be taken in sequence other than those described, and more, fewer or equivalent elements or components could also be used.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A data transformation device comprising:
   an interface for receiving a request for data for display on a display device;
   a processor configured with software instructions to perform operations comprising:
   acquiring the requested data, wherein the requested data comprise first and second data elements;
   applying to the requested data a rule to identify one or more formats in which the requested data may be displayed;
   receiving a user indication of at least one selected format from the one or more identified formats;
   transforming the requested data according to the at least one selected format to produce a graphical representation simultaneously depicting the first data elements in two dimensions and the second data elements in three dimensions superimposed on one another; and
   sending the graphical representation for displaying on the display device.

2. The device of claim 1, wherein the operation of acquiring the requested data comprises acquiring the requested data from a datastore.

3. The device of claim 1, wherein the operation of acquiring the requested data comprises acquiring the requested data from a real-time source.

4. The device of claim 1, wherein the processor is further configured to perform operations comprising:
   updating the requested data; and
   transforming the updated requested data according to the at least one selected format to produce an updated graphical representation of the first and second data elements simultaneously in two dimensions and three dimensions superimposed on one another; and
   sending the updated graphical representation to the display device.

5. The device of claim 1, wherein the at least one display format is selected from the group consisting of two-dimensional surface morphing, two-dimensional plane rotation, two-dimensional to three-dimensional morphing, and two-dimensional/three-dimensional combined data representation.

6. The device of claim 1, wherein the at least one selected format is two-dimensional surface morphing and the operation of transforming the requested data according to the at least one selected format to produce a graphical representation simultaneously depicting the first data elements in two dimensions and the second data elements in three dimensions superimposed on one another comprises applying the second data elements to a portion of a two dimensional graphical representation of the first data elements so as to produce a three dimensional graphical representation superimposed on the two-dimensional representation, the three dimensional graphical representation having a vertical displacement of the portion of the two-dimensional representation relative to a vertical axis.

7. The device of claim 1, wherein the request indicates whether a vertical dimension of the second data elements is to be represented linearly or non-linearly.

8. The device of claim 1, wherein the operation of depicting the second data elements in three dimensions comprises depicting a scale in a vertical dimension.

9. The device of claim 1, wherein the operation of sending the graphical representation for displaying on the display device comprises sending the graphical representation to a network location accessible to the display device.

10. The device of claim 1, wherein the processor is further configured to perform operations comprising:
    acquiring additional data elements;
    assigning a color to the additional data elements; and
    transforming the additional data elements according to the at least one selected format to produce a graphical representation simultaneously depicting the first data elements and the additional data elements in two dimensions in the assigned color.

11. The system of claim 1, wherein the at least one format comprises a plurality of formats and wherein the operation of transforming the requested data elements according to the at least one selected format comprises transforming the requested data by applying the plurality of formats sequentially or simultaneously to the first and second data elements.

12. The system of claim 1, wherein the at least one format comprises two dimensional plane rotation and wherein the operation of transforming the requested data according to the selected format comprises rotating and tilting a two dimensional representation of the first data elements in a direction to produce a different view of the first data elements.

13. The system of claim 1, wherein the at least one format comprises two dimensional to three dimensional morphing and wherein the operation of transforming the requested data according to the selected format comprises transforming a two dimensional representation of the second data elements into a three dimensional representation of the second data elements.

14. The system of claim 1, wherein the at least one format comprises two-dimensional/three-dimensional combined data representation and wherein the operation of transforming the requested data according to the at least one selected format to produce a graphical representation simultaneously depicting the first data elements in two dimensions and the second data elements in three dimensions comprises depicting a two dimensional representation of the first data elements over which the second data elements representing a third axis of data are rendered such that the second data elements appear as graphic representations at one or more levels above a two-dimensional plane.

15. The device of claim 1, wherein the request identifies the first data elements for displaying in two dimensions and the second data elements for displaying in three dimensions.

16. A method for transforming data, the method comprising:
acquiring by a processor a request for data for display on a display device, wherein the requested data comprise first and second data elements;
applying to the requested data by the processor a rule to identify one or more formats in which the requested data may be displayed;
receiving by the processor a user indication of at least one selected format from the one or more identified formats;
transforming by the processor the requested data according to the at least one selected format to produce a graphical representation simultaneously depicting the first data elements in two dimensions and the second data elements in three dimensions superimposed on one another; and
sending by the processor the graphical representation to the display device.

17. The method of claim 16, wherein acquiring the requested data comprises acquiring the requested data from a datastore.

18. The method of claim 16, wherein acquiring the requested data comprises acquiring the requested data from a real-time source.

19. The method of claim 16 further comprising:
updating the requested data;
transforming the updated requested data according to the at least one selected format to produce an updated graphical representation of the first and second data elements simultaneously in two dimensions and three dimensions superimposed on one another; and
sending the graphical representation for displaying on a display device.

20. The method of claim 16, wherein the at least one display format is selected from the group consisting of two-dimensional surface morphing, two-dimensional plane rotation, two-dimensional to three-dimensional morphing, and two-dimensional/three-dimensional combined data representation.

21. The method of claim 16, wherein the at least one selected format is two-dimensional surface morphing and transforming by the processor the requested data elements according to the at least one selected format to produce a graphical representation simultaneously depicting the first data elements in two dimensions and the second data elements in three dimensions superimposed on one another comprises applying the second data elements to a portion of a two dimensional graphical representation of the first data elements so as to produce a three dimensional graphical representation superimposed on the two-dimensional representation, the three dimensional graphical representation having a vertical displacement of the portion of the two-dimensional representation relative to a vertical axis.

22. The method of claim 16, wherein the request indicates whether a vertical dimension of the second data elements is to be represented linearly or non-linearly.

23. The method of claim 16, wherein depicting the second data elements in three dimensions comprises depicting a scale in a vertical dimension.

24. The method of claim 16, wherein sending by the processor the graphical representation for displaying on the display device comprises sending the graphical representation to a network location accessible to the display device.

25. The method of claim 16 further comprising:
acquiring additional data elements;
assigning a color to the additional data elements; and
transforming the additional data elements by the processor according to the at least one selected format to produce a graphical representation simultaneously depicting the first data elements and the additional data elements in two dimensions in the assigned color.

26. The method of claim 16, wherein receiving by the processor at least one selected format from the one or more identified formats comprises receiving by the processor a plurality of formats from the one or more identified formats and wherein transforming by the processor the requested data according to the at least one selected format comprises transforming the requested data by applying the plurality of formats sequentially or simultaneously to the first and second data elements.

27. The method of claim 16, wherein the at least one format comprises two dimensional plane rotation and wherein transforming by the processor the requested data according to the selected format comprises rotating and tilting by the processor a two dimensional representation of the first data elements in a direction to produce a different view of the first data elements.

28. The method of claim 16, wherein the at least one format comprises two dimensional to three dimensional morphing and transforming by the processor the requested data according to the selected format comprises transforming by the processor a two dimensional representation of the second data elements into a three dimensional representation of the second data elements.

29. The method of claim 16, wherein the at least one format comprises two-dimensional/three-dimensional combined data representation and wherein transforming by the processor the requested data according to the selected format comprises depicting by the processor a two dimensional representation of the first data elements over which the second data elements representing a third axis of data are rendered such that the second data elements appear as graphic representations at one or more levels above a two-dimensional plane.

30. The method of claim 16, wherein the request identifies the first data elements for displaying in two dimensions and the second data elements for displaying in three dimensions.

31. A method for transforming data, the method comprising:
acquiring by a processor a request for data for display on a display device, wherein the request identifies data elements for displaying in a first selected dimension;
transforming by the processor the data elements to produce a graphical representation depicting the data elements in the first selected dimension;
transforming by the processor the graphical representation depicting the data elements in the first selected dimension to a graphical representation depicting the data elements in a second selected dimension, wherein the transforming from the first selected dimension to the second selected dimension generates a plurality of transient graphical representations and occurs over a time period; and sending by the processor the graphical representation depicting the data elements in the first selected dimension, the plurality of transient graphical representations and the graphical representation depicting the data elements in a second selected dimension to the display device.

32. The method of claim 31, wherein the first selected dimension is a two-dimensional display and wherein the second selected dimension is a three-dimensional display.

33. The method of claim 31, wherein the first selected dimension is a three-dimensional display and wherein the second selected dimension is a two-dimensional display.

34. The method of claim 31 further comprising:
freezing by the processor a display of a transient graphical representation in response to a first command; and
restarting by the processor the transformation of the graphical representation depicting the data elements in the first selected dimension to the graphical representation depicting the data elements in the second selected dimension after the freezing in response to a second command.

35. The method of claim 34 further comprising:
rotating the frozen transient graphical representation from a first orientation to a second orientation in response to a third command.

* * * * *